Aug. 14, 1934.    R. J. STATZ    1,969,861
SHOE BURNISHER
Filed Jan. 30, 1930    2 Sheets-Sheet 1

INVENTOR.
ROBERT J. STATZ
BY *M. W. McConkey*
ATTORNEY

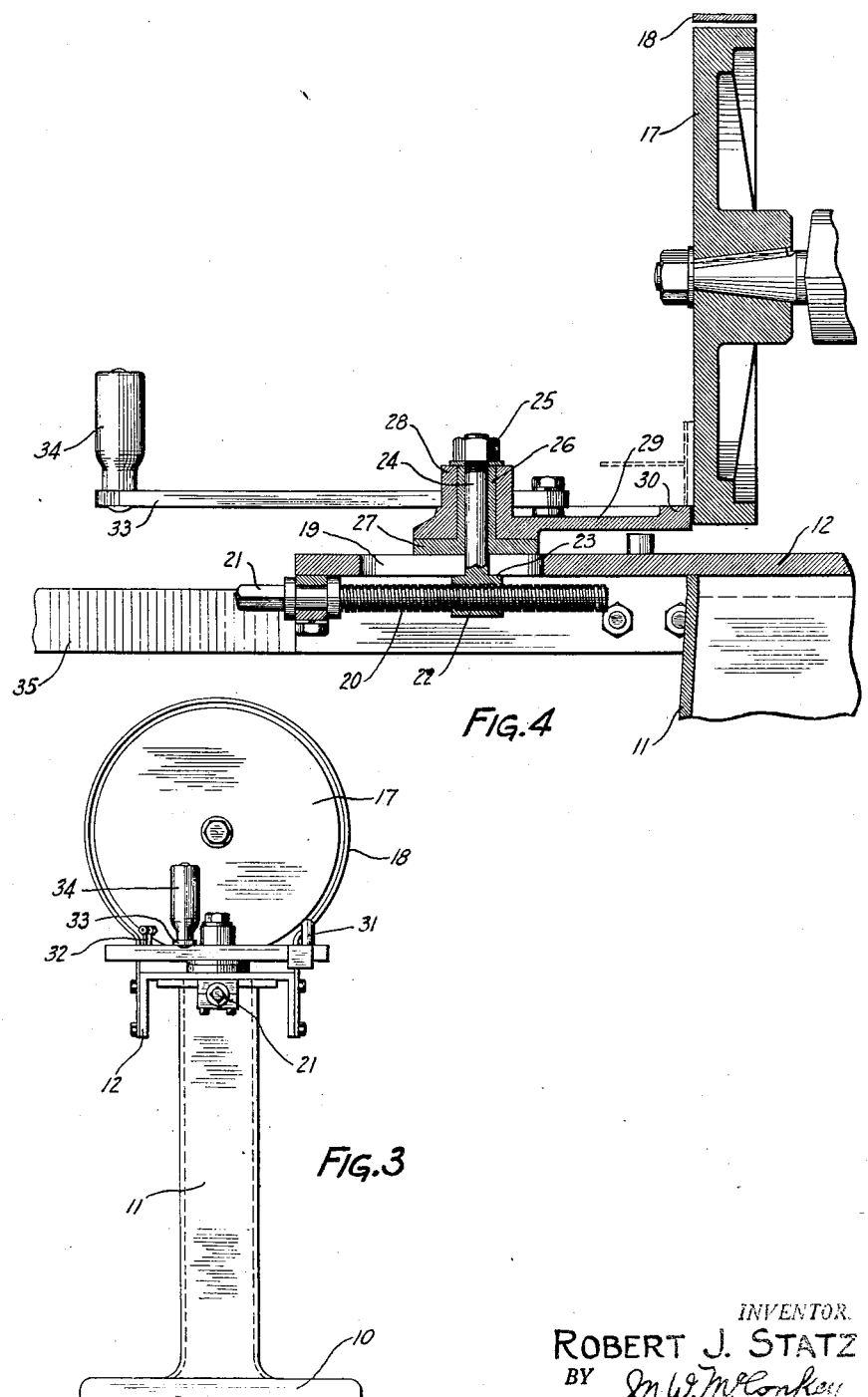

Patented Aug. 14, 1934

1,969,861

UNITED STATES PATENT OFFICE 1,969,861

SHOE BURNISHER

Robert J. Statz, South Bend, Ind., assignor to Bendix-Cowdrey Brake Tester, Inc., Fitchburg, Mass., a corporation of Delaware Application January 30, 1930, Serial No. 424,686

1 Claim. (Cl. 29—90)

This invention relates to burnishing machines and more particularly to burnishing machines wherein the work piece is rocked across the face of a rotating burnishing disk.

An object of the invention is to provide an efficient and highly serviceable burnishing machine adapted for each and all of the various and varied requirements of general service and capable of accurately grinding down or burnishing different kinds and sizes of work.

Another object of the invention is to provide a burnishing machine particularly designed for burnishing the lining on brake shoes.

Other objects of the invention will appear from the following description taken in connection with the drawings, which form a part of this specification, and in which:

Figure 3 is a front elevation; and

Figure 4 is a detailed view partially in section.

Figure 1:
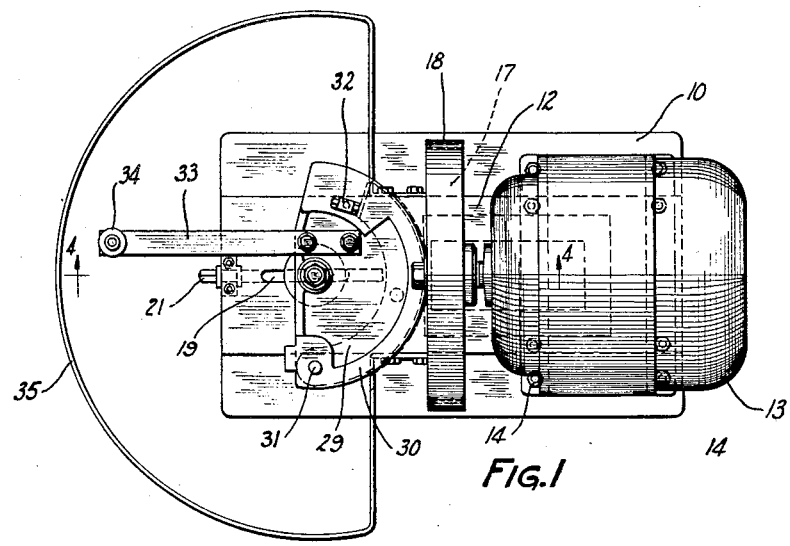
Figure 1 is a top plan view.
Figure 2:
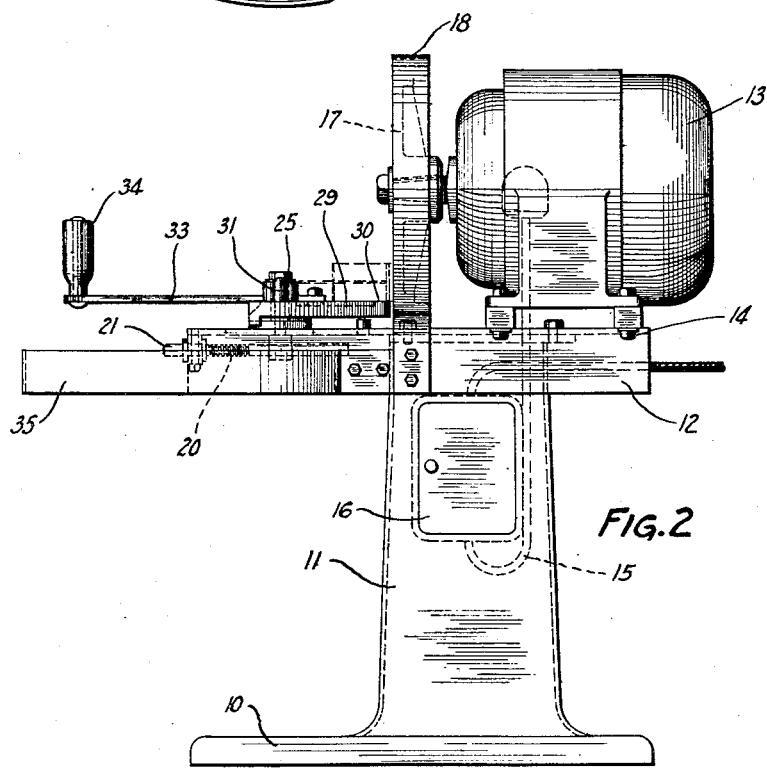
Figure 2 is a side elevation.

Referring to the drawings and more specific details of the invention, 10 represents a base supporting a pedestal 11 having thereon a table 12. As shown, a motor 13 is positioned on the table and suitably secured thereto as by bolts 14. The motor is adapted to be driven by suitable electrical current transmitted thereto through a feed line 15 having a cut-off switch, not shown, but enclosed within the pedestal back of a door 16 arranged in one side thereof.

A burnishing disk 17 of any preferred type is keyed or otherwise secured on the shaft of the motor, and a guard 18 secured to the table is arranged in spaced relation to the periphery of the disk. It will, of course, be clearly understood that the burnishing disk 17 may be replaced by a grinding wheel if so desired.

The table is provided with a slot 19 arranged at right angles to the plane of rotation of the disk 17 and preferably in a vertical plane passing diametrically through the axis of the shaft. A screw 20 is mounted for rotation beneath the slot 19. As shown, the screw is suitably journaled on the bottom of the table in a vertical plane passing longitudinally through the slot. The screw is provided with the conventional nut 21 by means of which it may be driven.

A sleeve 22 is mounted to travel on the screw 20. This sleeve is provided with a flat face 23 adapted to engage the bottom of the table on each side of the slot 19 and formed integrally with the sleeve is a stud 24 which extends through the slot and is threaded to receive a nut 25.

A sleeve 26 is positioned on the stud 24 and secured in position by the nut 25. This sleeve is provided with a flange 27 engaging the top of the table on each side of the slot 19. By suitable adjustment of the nut 25 on the stud 24, free reciprocation of the stud in the slot may be afforded and yet sufficient rigidity of the stud maintained.

Mounted for oscillation on the sleeve 26 is a sleeve 28 having formed integral therewith a segment provided with a flange 30. The segment is provided with a fixed pin 31 arranged adjacent to one end of the flange 30 and an adjustable member 32 positioned contiguous to the other end of the flange, the object of which will hereinafter appear.

Detachably secured to the segment is a lever 33 having positioned on the free end thereof a handle 34 and a guard 35 secured to the table is arranged beyond the sweep of the lever for the protection of the operator.

In operation, a work piece, as for example a brake shoe, is placed on the segment where it is held in position by the fixed pin 31 and the adjustable member 32. The screw 20 is then rotated to move the stud 24 to a position in the slot 19 where the work piece, or as shown the brake shoe, engages the face of the burnishing wheel. Assuming the burnishing wheel to be in rotation, the lever 33 is rocked to oscillate the segment 29 and consequently the work piece rocked thereon. This rocking movement of the work piece across the face of the rotating burnishing disk very effectively burnishes the work piece or brake shoe lining, as the case may be.

While a preferred embodiment of the invention has been described, it is to be understood that this is given merely as an example of the underlying principles of the invention, and since these may be incorporated in other specific mechanical structures, I do not intend to be limited to that shown except as such limitations are clearly imposed by the appended claim.

I claim:

A burnishing machine for automobile brake shoes, comprising a rotary disc burnishing element, a spindle mounted for reciprocation toward and away from the burnishing element, means for reciprocating the spindle including a screw, a support mounted for oscillation on the spindle, a circular flange on said support a pin on the support adjacent one end of the flange adapted to be inserted in an aperture in the brake shoe, an adjustable stop on the support adjacent the other end of said flange adapted to abut an end of the brake shoe and positively position the shoe thereon against the flange, and means for oscillating the support.

ROBERT J. STATZ.